United States Patent
Hsu (10) Patent No.: US 8,793,564 B2
(45) Date of Patent: Jul. 29, 2014

(54) EMBEDDED SYSTEM WITH WEB-BASED USER INTERFACE, FIRMWARE STRUCTURE THEREOF AND METHOD FOR PROVIDING INFORMATION THEREOF

(75) Inventor: Fu-Jen Hsu, Taoyuan (TW)

(73) Assignee: Arcadyan Technology Corporation, Hsinchu (TW)

( * ) Notice: Subject to any disclaimer, the term of this patent is extended or adjusted under 35 U.S.C. 154(b) by 1368 days.

(21) Appl. No.: 12/219,406

(22) Filed: Jul. 22, 2008

(65) Prior Publication Data

US 2009/0031212 A1 Jan. 29, 2009

(30) Foreign Application Priority Data

Jul. 23, 2007 (TW) .............................. 96126837 A (51) Int. Cl.
  *G06F 17/00* (2006.01)
  *G06F 17/20* (2006.01)
  *G06F 9/50* (2006.01)
  *H04L 29/08* (2006.01)

(52) U.S. Cl.
  CPC ............ *G06F 9/5055* (2013.01); *H04L 67/025* (2013.01)
  USPC ........... 715/200; 715/201; 715/234; 715/255; 715/256; 704/1; 704/8

(58) Field of Classification Search
  USPC ................. 715/200, 234, 255–256, 264, 700; 704/1, 8
  See application file for complete search history.

(56) References Cited

U.S. PATENT DOCUMENTS

| | | | |
|---|---|---|---|
| 7,389,300 B1 * | 6/2008 | Shah et al. | 1/1 |
| 7,406,418 B2 * | 7/2008 | Chiu | 704/270 |
| 7,779,055 B2 * | 8/2010 | Peng | 707/819 |
| 2002/0143523 A1 * | 10/2002 | Balaji et al. | 704/8 |
| 2004/0260535 A1 | 12/2004 | Chen et al. | |
| 2004/0268306 A1 | 12/2004 | Cheng et al. | |
| 2005/0033746 A1 * | 2/2005 | Chao et al. | 707/10 |
| 2005/0204018 A1 * | 9/2005 | Jensen | 709/219 |
| 2006/0080336 A1 * | 4/2006 | Zhang et al. | 707/100 |
| 2006/0174055 A1 * | 8/2006 | Flynn | 711/100 |
| 2007/0061129 A1 * | 3/2007 | Barreiro | 704/9 |
| 2007/0300150 A1 * | 12/2007 | Davis | 715/513 |

FOREIGN PATENT DOCUMENTS

TW 476028 2/2002
TW 200622721 7/2006

* cited by examiner

*Primary Examiner* — Chau Nguyen
(74) *Attorney, Agent, or Firm* — Bacon & Thomas, PLLC (57) ABSTRACT

Embedded system with web-based user interface, firmware structure thereof, and method for providing information thereof are provided. The firmware of the embedded system includes an execution part and a presentation part, which are separated, wherein the execution part includes a web service program and a program interface while the presentation part includes a web page which includes a request for dynamic content associated with the program interface so as to obtain corresponding dynamic content. When the system takes the presentation part as the static content of its web-based user interface, the web service program, in response to a static content request, reads the web page from the non-volatile memory and outputs it to a device, and in response to the dynamic content request, invokes the program interface to obtain the corresponding dynamic content and output it to the device.

23 Claims, 3 Drawing Sheets

EMBEDDED SYSTEM WITH WEB-BASED USER INTERFACE, FIRMWARE STRUCTURE THEREOF AND METHOD FOR PROVIDING INFORMATION THEREOF

This application claims the benefit of Taiwan application Serial No. 96126837, filed Jul. 23, 2007, the subject matter of which is incorporated herein by reference.

BACKGROUND OF THE INVENTION

1. Field of the Invention

The invention relates in general to an embedded system, and more particularly to an embedded system with web-based user interface, a firmware thereof and a method for providing information thereof.

2. Description of the Related Art

A major problem that arises in the development and design of an embedded system is how its memory resource is used, such as how much memory space is occupied by its firmware, since the embedded system has a limited amount of computing and memory resource.

For example, a flash memory that is generally employed to store the firmware of an embedded system has a limited memory capacity that is inadequate to store executable code for user interface of all different human languages that are supported by the embedded system. In order to enable the embedded system to provide a user interface with a different language, a conventional approach is to provide firmware images for different languages, for example, in an optical disk or a web site, so that the user can download any of the images and update the firmware of the embedded system. When the user wants to switch the user interface for a selected language, the corresponding firmware image must be written onto the flash memory to overwrite the previous firmware image entirely. The embedded system, after rebooting, will operate with the user interface for the selected language.

The conventional approach to switching of the user interface for a different language is readily to be implemented. However, the need of overwriting the previous firmware image and rebooting the whole system is time-consuming and inconvenient.

In addition, booting a conventional embedded system initially requires reading the firmware, which is pre-compressed, from the flash memory, decompressing the firmware to obtain executable code and storing the executable code in a random access memory (RAM) until the decompression of the firmware is completed. The system and application programs, including user interface programs, cannot be invoked from the executable code unless the above decompression is finished. Thus, if the available memory space of the RAM is inadequate, the overall system performance will be degraded. A common solution to this problem is to install RAM devices with large capacity. However, the product cost of the system will be inevitably increased.

SUMMARY OF THE INVENTION

The invention is directed to an embedded system with web-based use interface, a firmware structure thereof and a method for providing information thereof. According to embodiments of the invention, the memory space of the RAM of the embedded system, when operating, can be saved. In addition, when the firmware is updated with respect to the user interface, for example, switching to a user interface for a different language, the related process is more convenient and flexible so that, for example, the firmware need not to be entirely updated and rebooting of the system becomes unnecessary.

According to a first aspect of the invention, a firmware structure of an embedded system with web-based user interface is provided. In this firmware structure, the user interface and the programs are separated into at least two individual parts, a presentation part and an execution part.

According to a second aspect of the invention, a method for providing information for use in an embedded system with web-based user interface is provided. The method includes the following steps. First, a firmware is provided, including an execution part and a first presentation part in different regions of a non-volatile memory of the embedded system, wherein the execution part includes a web service program and a first program interface, the first presentation part includes a first web page, the first web page includes a dynamic content request, and the dynamic content request is associated with the first program interface so as to obtain corresponding dynamic content. When the embedded system employs the first presentation part as static content of the user interface of the embedded system, in response to a static content request, the web service program finds the first web page from the first presentation part in the non-volatile memory and outputting the first web page to a device; in response to the dynamic content request sent from the device, the web service program invokes the first program interface so as to obtain the corresponding dynamic content; and the corresponding dynamic content is outputted to the device.

According to a third aspect of the invention, an embedded system with web-based user interface is provided. The embedded system includes a microprocessor; a random access memory, and a non-volatile memory storing a firmware that includes an execution part and a first presentation part in different regions of the non-volatile memory. The execution part includes a web service program and a first program interface, the first presentation part includes a first web page, the first web page includes a dynamic content request, and the dynamic content request is associated with the first program interface so as to obtain corresponding dynamic content. When the embedded system employs the first presentation part as static content of the user interface of the embedded system, the microprocessor executes the web service program. In addition, the microprocessor, in response to a static content request, finds the first web page from the first presentation part in the non-volatile memory and output the first web page to a device. The microprocessor, in response to the dynamic content request sent from the device, invokes the first program interface so as to obtain the corresponding dynamic content. The microprocessor outputs the corresponding dynamic content to the device.

The invention will become apparent from the following detailed description of the preferred but non-limiting embodiments. The following description is made with reference to the accompanying drawings.

DETAILED DESCRIPTION OF THE INVENTION

The invention is directed to a firmware structure of an embedded system with web-based use interface, an embedded system including the firmware structure and a method for providing information thereof. The following embodiments illustrates the several aspects of the invention, including (1) a firmware structure, (2) the usage of memory as the embedded system is operative, (3) a method for providing information of the embedded system.

(1) Firmware Structure

The user interface of a conventional embedded system, regardless of text or graphical interface, is provided by executable code of the system and application programs. That is, the user interface has been combined into the executable code of the system and application programs during their compilation. As a result, switching the user interface of the conventional embedded system to another one for a different language is to update the system and application programs completely. In other words, the switching of the user interface, conventionally, necessitates a complete update of the firmware.

Regarding the above problem, in the following embodiments of the invention, the user interface of an embedded system is based on web pages and the firmware structure includes at least two separate parts, namely, a presentation part and an execution part, for user interface and system programs respectively.

The execution part includes programs that enable the operation of the embedded system, for example, application programs, system programs or embedded operating system, such as embedded Linux or Windows CE operating system. The execution part includes a web service program that provides information in response to a request from a user side for information, for example, the program httpd, i.e. hypertext transfer protocol daemon. The presentation part includes files, such as a plurality of web pages that are employed as user interface and files related to the formats, manners of presentation, and content of the web pages. The programs of the execution part can refer to the files of the presentation part.

The execution part and presentation part are stored in different regions of the non-volatile memory of the embedded system. Specifically, the user interface is provided by the files included in the presentation part, presenting in a browser of the user side, rather than provided by the system and application programs included in the execution part.

Figure 1:
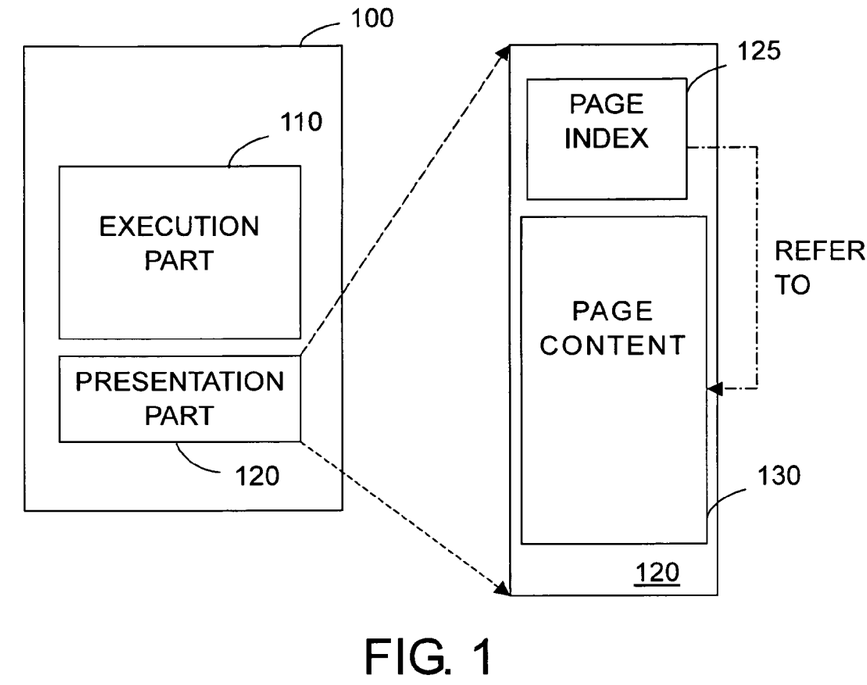
FIG. 1 illustrates a firmware structure of an embedded system with web-based user interface according to a first embodiment of the invention.

Referring to FIG. 1, a firmware structure is illustrated according to a first embodiment of the invention. As illustrated in FIG. 1, a firmware 100 includes at least an execution part execution part 110 and a presentation part 120 and the two parts are stored in different memory regions of a non-volatile memory, for example, flash memory, of an embedded system. The presentation part presentation part 120 includes a page index 125 and page content 130 indicating a plurality of web pages. One of the web pages can be found by using an index value of the page index 125.

In the embodiment of the firmware structure, the execution part 110 is separated from the presentation part 120, without overlapping. Accordingly, when it is required updating the user interface in the firmware 100, along with the execution part 110 remaining unchanged, the update can be sufficiently achieved by updating or replacing the presentation part 120. Likewise, updating or replacing the presentation part 120 is sufficient to achieve the requirement of switching the user interface to one for a different language or to one with a different interface view, i.e. a different "look and feel" of the user interface. For example, the presentation part 120 is an English user interface originally. When it is needed to switch to a user interface for Chinese, the switching can be achieved sufficiently by replacing the presentation part 120 with one for Chinese. An updated version for a portion of the firmware or other versions for a part of the firmware for different languages can be downloaded from a source external to the embedded system, for example, downloading from a file server in a network or an external storage device to the embedded system. For example, a downloaded part of the firmware can be stored in a random access memory temporarily and then in the flash memory. In another example, if the memory space of the flash memory is adequate to store the downloaded part of the firmware, the original part to be updated or replaced can be reserved in the firmware and the downloaded part can be stored in other memory region of the firmware.

Figure 2:
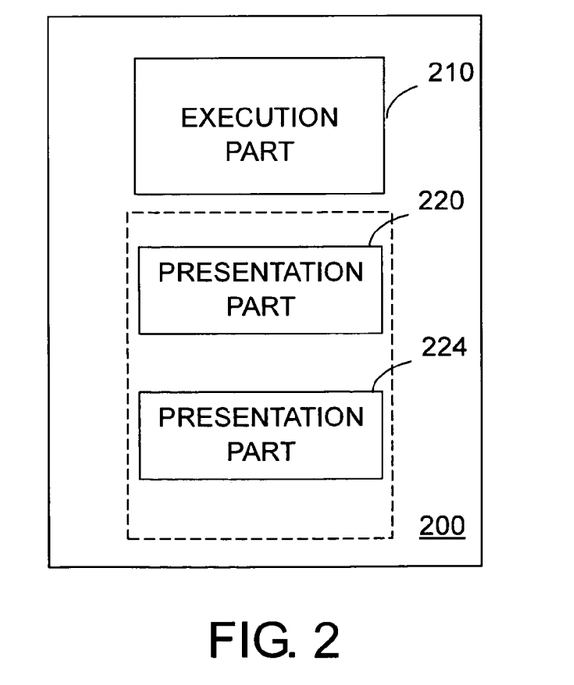
FIG. 2 illustrates another firmware structure according to a second embodiment of the invention.

FIG. 2 illustrates another firmware structure of a second embodiment, based on the above first embodiment. As compared to the first embodiment, a firmware 200 in the second embodiment includes a plurality of presentation parts, such as a first presentation part 220 and a second presentation part 224. These presentation parts and the execution part 210 of the firmware 200 are stored in different regions of a non-volatile memory of the embedded system. These presentation parts, being similar to the above presentation part 120, each include a page index and page content indicating a plurality of web pages, wherein an index value in the page index of each presentation part can be used to refer to an associated one of the web pages in the corresponding page content.

According to the second embodiment, a first example is provided to illustrate a situation in which each of the presentation parts includes a plurality of web pages employed as the user interface for a specific language. For example, the first presentation part 220 includes a plurality of web pages employed as the user interface for a first language, such as English, while the second presentation part 224 includes a plurality of web pages employed as the user interface for a second language, such as Chinese.

The first presentation part 220 and second presentation part 224 can be referred to by a program of the execution part 210, such as a web service program, in order to read web pages in the presentation parts. When the embedded system takes English as the language for the user interface, the execution part 210 refers to the first presentation part 220. When Chinese is taken as the language for the user interface, the execution part 210 refers to the second presentation part 224.

Hence, when it is required to switch the English user interface (the first presentation part 220) to the Chinese user interface (the second presentation part 224), the web service program can be set to retrieve the web page of the second presentation part 224. For example, the web service program can read a specific web page in the page content of the second presentation part 224 by taking the start position of the second presentation part 224 as a basis for determining the position of the specific web page.

Similarly, in a second example, in which each presentation part includes a plurality web pages indicating a specific user interface view, manner of switching of user interface in the above first example can be applied to the second example to achieve the switching of one user interface view to another user interface view.

According to the above embodiments, when a part of the firmware, either an execution part or a presentation part, is to be updated and the other parts are not, replacing the part to be updated is sufficient. For example, in the first embodiment, if an updated version for the execution part 110 is produced based on, or with reference to, the presentation part 120 in present, it only needs to update or replace the execution part 110 with the updated version. For the second embodiment, if an updated version for the execution part 210 is produced based on, or with reference to, each presentation part in present, it only needs to update or replace the execution part 210 with the updated version.

In contrast to the conventional approach to firmware updating that requires the entire firmware being updated, the above embodiments of the invention requires, if appropriate, only a part to be updated. Thus, a reduced time can be achieved for firmware updating. Moreover, after updating user interface or switching to a user interface for a different language, the embedded system can apply the updated user interface without rebooting. In this way, the update process is more convenient and efficient.

Further, for the above embodiments, a web-based user interface, with respect to the principles of web page design, is also required to be separated into two parts: a page presentation part and a data retrieving part in order to achieve the separation of the presentation part and the execution part of the firmware. The page presentation part is the content that the user interface presents, such as static web pages, scripts indicating how to present information and other files required to present, e.g. images. In the above embodiments, a presentation part of the firmware is an example of the implementation of a page presentation part, wherein the files of the presentation part are stored in the embedded system and can be outputted to a browser. The data retrieving part is one or more processes for producing or obtaining dynamic information. When a browser handles a page presentation part, for example, a web page with code indicating a dynamic data request, if there is a need to present dynamic information, the browser can request the embedded system to execute a program representing the data retrieving part of the user interface to produce, or obtain, the dynamic information and output to the browser for processing. In the above embodiments, the execution part of the firmware further includes one or more program interfaces for producing, or obtaining, specific dynamic information, for example, employing common gateway interfaces (CGI) as an example of the data retrieving part of the user interface.

Further, in order to process the same requests for producing a piece of specific dynamic information, for example, the IP address of the embedded system, a corresponding program interface is adequate, regardless of which kind of language or what kind of user interface view that the user interface is taken. For example, a piece of specific dynamic information, such as an Internet protocol address (IP address) of the embedded system at present is requested when the browser of the user side executes some web pages from either the presentation part 120, as illustrated in FIG. 1, or the presentation part for another language, all such requests are processed by the embedded system processes with a same program interface. In another example, when some web pages from either the first presentation part 220 or second presentation part 224, as illustrated in FIG. 2, are executed by the browser of a user side, requesting a piece of specific dynamic information, such as an IP address of the embedded system at present, the embedded system processes all such requests with a same program interface. Thus, in order to achieve the presentation of dynamic information, the execution part 210 should include at least one program interface, such as a common gateway interface (CGI), for specific dynamic information, while the web service program operates with the program interface.

(2) Usage of Memory as the Embedded System is Operative

Figure 3:
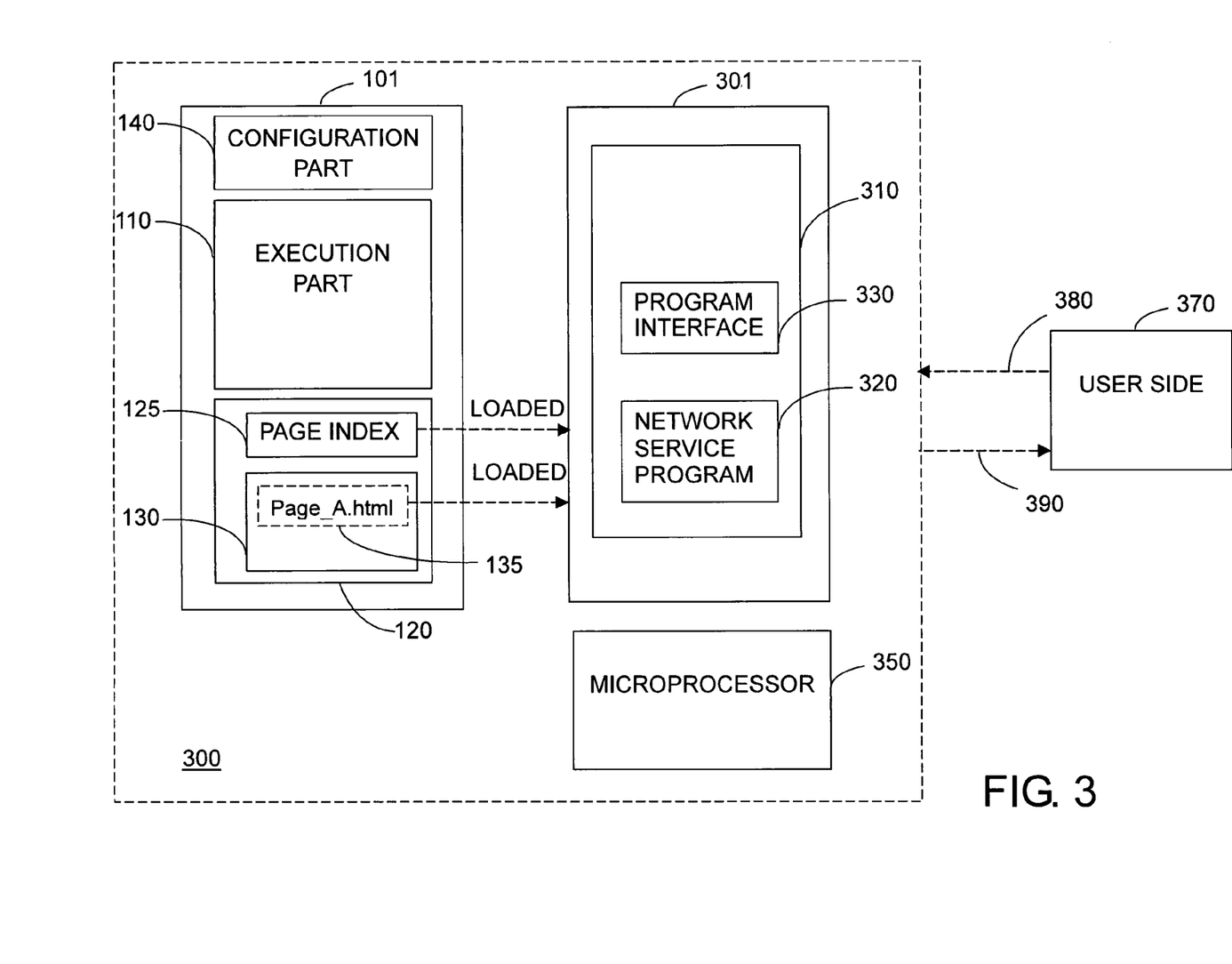
FIG. 3 shows an embedded system with web-based user interface and illustrates the use of the internal memory of the embedded system, according to a third embodiment of the invention.

FIG. 3 shows an embedded system 300 with web-based user interface and illustrates the use of the internal memory of the embedded system 300, as is operative, according to a third embodiment of the invention.

The basic structure of the embedded system 300, illustrated in FIG. 3, includes a microprocessor 350, a non-volatile memory 101, such as NAND or NOR type flash memory, and a RAM 301, such as SRAM, SDRAM, or DDR-SDRAM. The non-volatile memory 101 stores firmware, such as the one in the first embodiment, including an execution part 110 and a presentation part 120, wherein the presentation part 120 includes a page index 125 and page content 130. In addition, other examples of the embedded system according to the third embodiments can be obtained with the firmware structure in the non-volatile memory 101 based on the above first, second embodiments or other examples. The embedded system, for example, a networking device, such as an asymmetric digital subscriber line (ADSL) gateway or router, can be achieved based on the basic structure according to the embodiments of the invention. That is, the web-based user interface for the embedded system is presented, or displayed, by a browser of a user side 370 to be used as management of the embedded system. Any browser, which supports the communication protocol of the network service program at the server side, such as hypertext transfer protocol (HTTP) 1.0 or 1.1, can be employed. An example of the user side 370 can be an information-processing device that can execute a browser, such as a computer. The user side 370 can communicate with the embedded system 300 through a link, which can be implemented by using wired or wireless communication technique, according to design requirement. In an example of the embedded system 300 implemented as a networking device, a network interface is included for providing a link between the embedded system 300 and a device working as a client side (or called user side).

When the embedded system 300 starts up, the execution part 110 stored in the non-volatile memory 101 is read from the non-volatile memory 101 and stored in a memory region 310 of the RAM 301. The microprocessor 350 reads the memory region 310 for execution of some or all of the programs stored in the memory region 310 in order to enable the operation of the system. When a system or application program in the memory region 310, as being executed, requires reading a file included in the presentation part 120, the file is selected from the presentation part 120 in the non-volatile memory 101. For example, when the network service program 320 responds to a request from the user side 370, such as one indicated by an arrow 380, a web page 135 with a filename of Page_A.html, for example, is selected. The selected file is loaded and stored in the RAM 301 so that the program in the memory region 310, when it is necessary, can handle this file, for example, to send the file to the user side 370, as indicated by an arrow 390.

In an example where the presentation part 120 employs the page index 125 to enable the executing program to read the content of the presentation part 120, when it is required to read a web page, such as web page 135, the page index 125 is first loaded into the RAM 301 so that the executing program can read the page index 125 and accordingly determine which region in the page content 130 represents the web page 135. In another example, the execution part 110, preferably, contains compressed program code in order to save the storage space of the non-volatile memory 101 and in such a case, the content of the memory region 310 is the executable code obtained by decompression of the execution part 110. The web page in the presentation part 120, such as web page 135, can be also stored by compression in this way.

An example is given for explaining the relationship between the page index 125 and page content 130. In this example, the page content 130 includes 100 web pages while the page index 125 records the filenames and storage locations of the web pages in a form of list, such as a list of the start and end storage locations of the web pages in the page content 130. When a network service program requires one of these web pages, for example, a web page named "Page_A.html," the start and end locations of the web page, for example, 256 and 1024 from the start location of the presentation part 120, can be obtained according to the page index 125 and the filename of the web page so as to read the web page. In other examples, the page index 125 can be implemented by other ways to enable reading of a web page in the page content 130 according to the page index 125 and an index value, such as a filename or series number. For example, the page index 125 records the filenames or serial numbers of the web pages as well as either the start or end locations of the web pages.

In addition to the inclusion of the page index 125 in the presentation part 120 to enable reading of a web page in the page content 130, in other examples, a presentation part can be formed with information of the relative or absolute location of each web page in the page content, rather than the page index, so as to help the reading of a web page in the page content 130.

Thus, for the embedded system according to the third embodiment of the invention, when operating, a portion of the presentation part stored in the firmware is dynamically loaded into the RAM; that is, the portion, whenever needed, is read and stored in the RAM. In contrast to the conventional embedded system in which the program code including the user interface in the firmware is entirely decompressed and loaded into the RAM, the above embodiments of the invention can save the memory space of the RAM. Further, in another example, after the web page in the RAM is outputted to the user side, the system can release the memory space occupied by the web page, which is previously loaded into the RAM. In this way, it makes use of the memory space of the RAM more efficiently.

In a further example based on the above embodiments of the invention, the non-volatile memory 101 of the embedded system 300 can include a configuration part 140 for storing system or user configuration settings for access by the programs when operating. In such example, the configuration settings can be reserved even though the presentation or execution part is updated. For the developers and users, it is more efficient and save the time for re-setting the configurations.

(3) Method for Providing Information of the Embedded System

Figure 4:
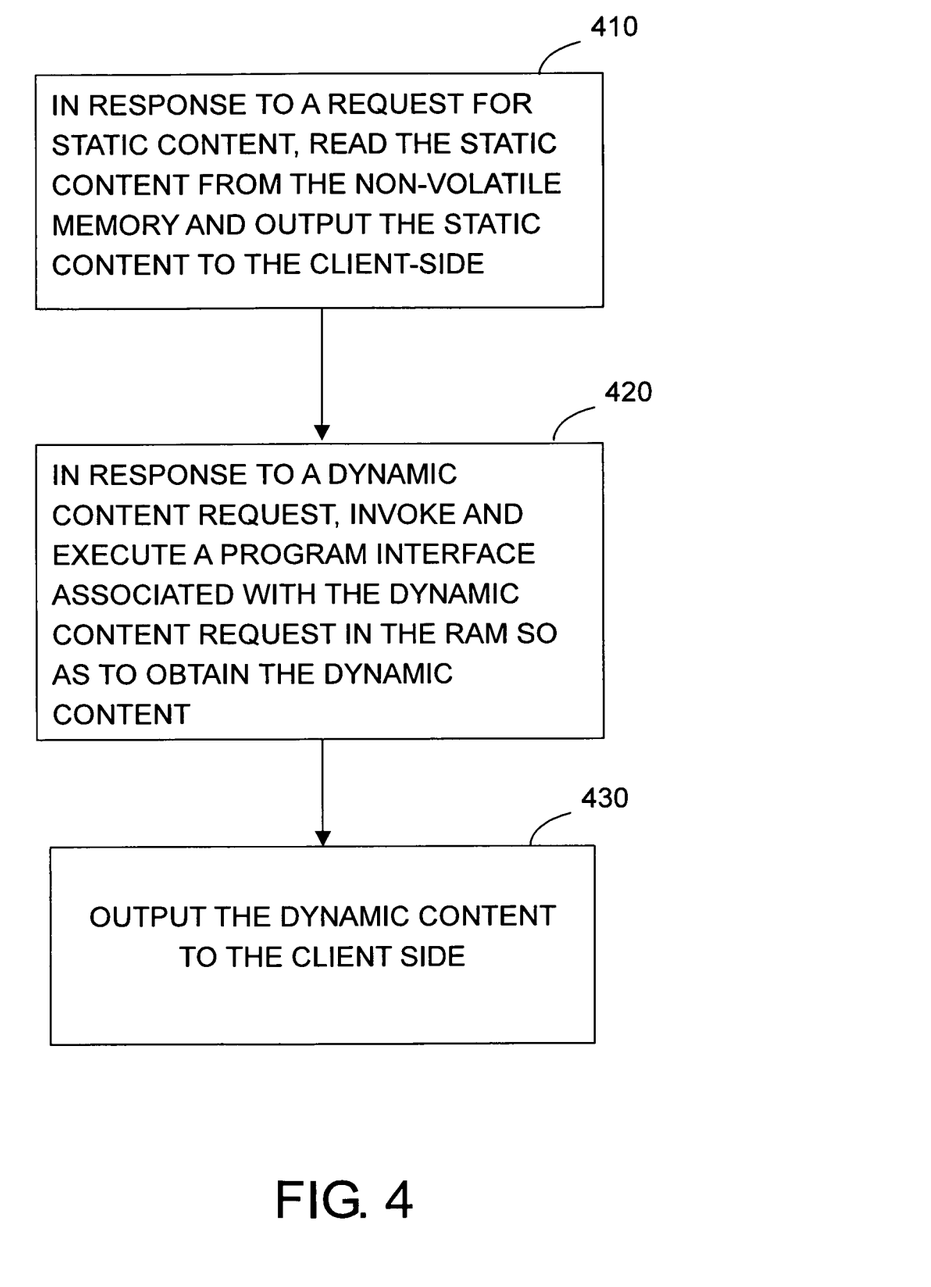
FIG. 4 is a flowchart illustrating a method for providing information according to a fourth embodiment for use in the embedded system shown in FIG. 3.

Referring to FIG. 4, a flowchart for a method for providing information of the embedded system 300 of the third embodiment is shown, according to a fourth embodiment of the invention. In the embedded system 300, i.e. the server side, the network service program 320, in response to a request from the browser of the client side for specific content (or information), provides the content to the client side with the browser presenting the content. The content that the server side provides can be divided into two categories: static content and dynamic content. The static content indicates a file existing in the server side, such as a web page compliant with HTML or extended-HTML (XHTML), a Script file for presenting information, e.g. written in JavaScript, a cascading style sheets (CSS) file for describing the style, such as fonts or shape, of the presentation of the web page, an image file, such as JPEG or GIP images, or a text file. The dynamic content indicates the content or information produced by a network service program or other program in the server side.

In the fourth embodiment, the page content 130 of the presentation part 120 stores the static content of the server side. Each presentation part, which can be categorized as being for different countries or regional languages, or different interface views, has different content accordingly. In addition, the dynamic content of the server side is generated by at least a program interface in a memory region 310 of the RAM 301, such as a program interface 330.

In addition, regarding reduction of the loading of the server side for providing information, a web page that works as a user interface, in terms of design principle, can be divided into three parts: interface presentation part, data presentation part, and data retrieving part.

The interface presentation part indicates static web page content, such as text and image file.

The data presentation part indicates a portion of a web page, written in a script language, to instruct the browser to present static data in a manner specified by the instructions of the portion. In an example, such portion can be described in terms of external linking statements, for example: <script language="javascript" src="style.js"></script>, wherein style.js is a script or program written in JavaScript script language to set the manner of presentation for a specific format or style. When the browser executes the above statements, a request for obtaining "style.js" is sent. The embedded system, in response to this request, reads the file "style.js" from the presentation part 120 in the firmware and sends it to the user side 370 for execution. In other examples, a global script can be written in order for one or more specific formats or styles in the web page to be presented in consistent manners, such as the manners of presentation of dynamic HTML or HTML form field value update. When the web page including the global script is loaded, the browser sends the request so as to obtain and execute the global script file. Likewise, CSS files can be obtained in the above-mentioned manners and downloaded to the user side in order for the browser to execute.

The data retrieving part indicates a portion of a web page that make the browser to request the embedded system to obtain or generate dynamic information, for example, statements of a data retrieving request: <script language="javascript" src="cgi-bin/cgi_wanip.js"></script>, wherein cgi_wanip.js is a CGI program interface written in JavaScript and differs from style.js of the presentation part 120 of the firmware in that cgi_wanip.js exists in the execution part 110, such as the memory region 310. When the browser executes the above statements, a CGI request, for example, is in the form of http://192.168.1.1/cgi-bin/cgi_wanip.js. The network service program, in response to the CGI request, invokes cgi_wanip.js in the memory region 310 to execute and obtain the IP address of the system. Specifically, in this example, the result of the execution of cgi_wanip.js is called CGI retrieving data, an IP address in this case, and sent to the browser in terms of a variable, wherein a JavaScript engine is involved in processing in the browser. In addition, the web page executed by the browser invokes another script to present the static web page content and the CGI retrieving data.

The method for providing information of the fourth embodiment includes the following steps. In step 410, the server side, in response to a request for static content, such as a web page, reads the static content from the non-volatile memory and outputs the static content to the client side. If the static content that the client side receives from the server side includes a data retrieving part, that is, statements that invoke a program interface of the server side, such as a CGI interface, the client side sends a request for dynamic content, associated with the data retrieving part. In step 420, the network service program, in response to the dynamic content request, invokes and executes a program interface associated with the dynamic content request in the RAM so as to obtain the dynamic content. Next, in step 430, the dynamic content is outputted to the client side. In this way, the client side may perform further processing on the dynamic content, e.g. for presentation.

The embedded system with web-based user interface, the firmware thereof and the method for providing information thereof, as disclosed by the above embodiments of the invention, result in a reduced time to update firmware as compared to the conventional approach that requires update the firmware entirely. In addition, in a situation of updating user interface or changing user interface for another language, the user interface after updating can operate without the need of rebooting, which make the update process more time efficient and convenient. Further, in the above third and fourth embodiments, the manners for providing dynamic content and static content save the system resource being occupied when operating, such as the memory space of the RAM. Besides, in the fourth embodiment, the design principle for web pages can greatly reduce the loading of the server side for providing information and thus the program interface in the server side can be simplified. Therefore, in the fourth embodiment, when dynamic content, that is, dynamic data, is requested, the system can output the dynamic data only, such as IP address, to the browser. The script for the data presentation part of the web page executed in the browser of the client side handles the manner of presentation of the received dynamic data. In contrast, the conventional approach for dynamic data requires the generation and outputting of a complete web page containing the dynamic data and statements for presentation of the dynamic data.

While the invention has been described by way of examples and in terms of embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for providing information, for use in an embedded system with web-based user interface, the method comprising:
   providing a firmware, the firmware comprising an execution part and a first presentation part in different regions of a non-volatile memory of the embedded system, wherein the execution part comprises a web service program and a first program interface, the first presentation part comprises a first web page, the first web page comprises a dynamic content request, and the dynamic content request of the first web page is used to make the first program interface invoked so as to obtain corresponding dynamic content;
   when the embedded system employs the first presentation part as static content of the web-based user interface of the embedded system:
   in response to a static content request, finding, by the web service program, the first web page from the first presentation part in the non-volatile memory and outputting the first web page to a device;
   in response to the dynamic content request of the first web page sent from the device, invoking, by the web service program, the first program interface of the execution part so as to obtain the corresponding dynamic content; and
   outputting the corresponding dynamic content to the device.

2. The method according to claim 1, wherein the firmware further comprises a second presentation part in a different region of the non-volatile memory of the embedded system, the second presentation part comprises a second web page, the second web page comprises a dynamic content request, the dynamic content request is associated with the first program interface so as to obtain corresponding dynamic content.

3. The method according to claim 2, wherein
   when the embedded system employs the second presentation part as static content of the web-based user interface of the embedded system:
   in response to a static content request, finding, by the web service program, the second web page from the second presentation part in the non-volatile memory and outputting the second web page to the device;
   in response to the dynamic content request sent from the device, invoking, by the web service program, the first program interface so as to obtain the corresponding dynamic content; and
   outputting the corresponding dynamic content to the device.

4. The method according to claim 3, wherein the first presentation part indicates the web-based user interface in a first language and the second presentation part indicates the web-based user interface in a second language.

5. The method according to claim 3, wherein the first presentation part indicates the web-based user interface in a first interface view and the second presentation part indicates the web-based user interface in a second interface view.

6. The method according to claim 1, further comprising:
   replacing the first presentation part of the firmware with a second presentation part, wherein the second presentation part comprises a second web page, the second web page comprises a dynamic content request, the dynamic content request is associated with the first program interface so as to obtain corresponding dynamic content.

7. The method according to claim 6, wherein
   when the embedded system employs the second presentation part as static content of the web-based user interface of the embedded system:
   in response to a static content request, finding, by the web service program, the second web page from the second presentation part in the non-volatile memory and outputting the second web page to the device;
   in response to the dynamic content request sent from the device, invoking, by the web service program, the first program interface so as to obtain the corresponding dynamic content; and
   outputting the corresponding dynamic content to the device.

8. The method according to claim 7, wherein the first presentation part indicates the web-based user interface in a first language and the second presentation part indicates the web-based user interface in a second language.

9. The method according to claim 7, wherein the first presentation part indicates the web-based user interface in a first interface view and the second presentation part indicates the web-based user interface in a second interface view.

10. An embedded system with web-based user interface, comprising:

a microprocessor;

a random access memory; and a non-volatile memory storing a firmware, the firmware comprising an execution part and a first presentation part in different regions of the non-volatile memory, wherein the execution part comprises a web service program and a first program interface, the first presentation part comprises a first web page, the first web page comprises a dynamic content request, and the dynamic content request of the first web page is used to make the first program interface invoked so as to obtain corresponding dynamic content;

wherein when the embedded system employs the first presentation part as static content of the web-based user interface of the embedded system, the microprocessor executes the web service program:

in response to a static content request, to find the first web page from the first presentation part in the non-volatile memory and output the first web page to a device;

in response to the dynamic content request of the first web page sent from the device, to invoke the first program interface of the execution part so as to obtain the corresponding dynamic content; and to output the corresponding dynamic content to the device.

11. The system according to claim 10, wherein:

when the microprocessor executes the web service program, in response to the static content request, the microprocessor finds the first web page from the first presentation part in the non-volatile memory and stores the first web page in the random access memory;

after the first web page is outputted to the device, the microprocessor releases memory space of the random access memory in which the first web page stores.

12. The system according to claim 10, wherein the firmware further comprises a second presentation part in a different region of the non-volatile memory of the embedded system, the second presentation part comprises a second web page, the second web page comprises a dynamic content request, the dynamic content request is associated with the first program interface so as to obtain the corresponding dynamic content.

13. The system according to claim 12, wherein when the embedded system employs the second presentation part as static content of the web-based user interface of the embedded system:

the microprocessor executes the web service program, in response to a static content request, to find the second web page from the second presentation part in the non-volatile memory and output the second web page to the device;

in response to the dynamic content request sent from the device, to invoke the first program interface so as to obtain the corresponding dynamic content; and to output the corresponding dynamic content to the device.

14. The system according to claim 13, wherein the first presentation part indicates the web-based user interface in a first language and the second presentation part corresponds to a second language.

15. The system according to claim 13, wherein the first presentation part corresponds to a first interface view and the second presentation part corresponds to a second interface view.

16. The system according to claim 10, wherein:

the first presentation part of the firmware is replaced with a second presentation part, wherein the second presentation part comprises a second web page, the second web page comprises a dynamic content request, the dynamic content request is associated with the first program interface so as to obtain the corresponding dynamic content.

17. The system according to claim 16, wherein when the embedded system employs the second presentation part as static content of the web-based user interface of the embedded system:

the microprocessor executes the web service program, in response to a static content request, to find the second web page from the second presentation part in the non-volatile memory and output the second web page to the device;

in response to the dynamic content request, sent from the device, to invoke the first program interface so as to obtain the corresponding dynamic content; and to output the corresponding dynamic content to the device.

18. The system according to claim 17, wherein the first presentation part indicates the web-based user interface in a first language and the second presentation part indicates the web-based user interface in a second language.

19. The system according to claim 17, wherein the first presentation part indicates the web-based user interface in a first interface view and the second presentation part indicates the web-based user interface in a second interface view.

20. A computer-readable medium having stored thereon instructions as a system firmware, for use in an embedded system with web-based user interface, the computer-readable medium comprising:

a first memory region storing an execution part of the system firmware, comprising a web service program and a first program interface; and a second memory region storing a first presentation part of the system firmware, comprising a first web page, the first web page comprises a dynamic content request, and the dynamic content request of the first web page is used to make the first program interface invoked so as to obtain corresponding dynamic content, wherein the first presentation part is separate from the execution part;

wherein when the embedded system employs the first presentation part as static content of the web-based user interface of the embedded system:

in response to a static content request, the web service program finds the first web page from the first presentation part in the non-volatile memory, and outputs the first web page to a device;

in response to the dynamic content request of the first web page sent from the device, the web service program invokes the first program interface of the execution part so as to obtain the corresponding dynamic content, wherein the corresponding dynamic content is outputted to the device.

21. The computer-readable medium according to claim 20, wherein the second memory region further comprises a second presentation part, the second presentation part comprises a second web page, the second web page comprises a dynamic content request, the dynamic content request is associated with the first program interface so as to obtain corresponding dynamic content, wherein the second presentation part is separate from the execution part.

22. The computer-readable medium according to claim 21, wherein the first presentation part indicates the web-based user interface in a first language and the second presentation part indicates the web-based user interface in a second language.

23. The computer-readable medium according to claim 21, wherein the first presentation part indicates the web-based user interface in a first interface view and the second presentation part indicates the web-based user interface in a second interface view.

\* \* \* \* \*